United States Patent

Adamson et al.

[11] Patent Number: 5,494,306
[45] Date of Patent: Feb. 27, 1996

[54] SHOPPING CART WITH ADJUSTABLE HOLDER FOR CUPS

[75] Inventors: Mark Adamson, Broken Arrow; James F. Reinbold, Wagoner, both of Okla.

[73] Assignee: UNR Industries, Inc., Chicago, Ill.

[21] Appl. No.: 410,879

[22] Filed: Mar. 27, 1995

[51] Int. Cl.$^6$ ................................ B62B 3/14
[52] U.S. Cl. .................. 280/33.992; 280/DIG. 4; 211/74; 224/411
[58] Field of Search ............ 280/33.991, 33.992, 280/33.997, DIG. 3, DIG. 4; 211/74, 75, 88, 106, 113, 124; 224/282, 411; 248/214, 311.2, 313; 220/737, 738, 906, 742, 743

[56] References Cited

U.S. PATENT DOCUMENTS

| | | | |
|---|---|---|---|
| 2,601,571 | 6/1952 | Sverkerson | 211/74 |
| 2,633,278 | 3/1953 | Muniz | 224/42.46 |
| 2,946,458 | 7/1960 | Du Boff et al. | 211/88 |
| 3,912,291 | 10/1975 | Frisch | 280/33.99 A |
| 4,071,175 | 1/1978 | Wagnon | 248/311.2 |
| 4,685,701 | 8/1987 | Amundson et al. | 281/42 |
| 4,826,058 | 5/1989 | Nakayama | 224/42.44 |
| 4,892,281 | 1/1990 | DiFilippo et al. | 248/311.2 |
| 4,919,381 | 4/1990 | Buist | 220/738 |
| 4,938,492 | 7/1990 | Le Marchand et al. | 280/33.992 |
| 5,143,335 | 9/1992 | Frankel | 211/74 |
| 5,219,140 | 6/1993 | Spykerman | 248/311.2 |
| 5,228,611 | 7/1993 | Yabuya | 224/281 |
| 5,259,579 | 11/1993 | Schneider | 248/313 |
| 5,280,870 | 1/1994 | Chick et al. | 211/88 |
| 5,362,077 | 11/1994 | Adamson | 280/33.992 |
| 5,385,325 | 1/1995 | Rigsby | 248/311.2 |

FOREIGN PATENT DOCUMENTS

| | | |
|---|---|---|
| 4032868 | 4/1991 | Germany. |
| 645542 | 9/1962 | Italy. |
| 2271094 | 4/1994 | United Kingdom .............. 280/33.992 |

Primary Examiner—Margaret A. Focarino
Assistant Examiner—Min Yu
Attorney, Agent, or Firm—Dressler, Goldsmith, Shore & Milnamow, Ltd.

[57] ABSTRACT

A cup holder mounted to a transversely extending handle of a shopping cart includes a holding member and an adjusting member. The holding member is mounted fixedly to the handle so as to project from the handle. The adjusting member is mounted to the handle so as to be pivotable between an operative position and an inoperative position. The adjusting member has a distal edge facing toward a concave edge of the holding member in the operative position of the adjusting member and away from the concave edge thereof in the inoperative position of the adjusting member. A cup having a frusto-conical wall can be supported between the concave edge of the holding member and the distal edge of the adjusting member with the adjusting member in the operative position or between the concave edge of the holding member and a near portion of the handle with the adjusting member in the inoperative position. The holding member is made from a steel wire with two end portions wrapped partially around the handle and from a steel strap with a principal portion interposed between the end portions of the holding member and the handle and welded to the holding member and with an end flange mounted fixedly to one end of the handle. The adjusting member is made from a steel plate welded to a steel wire having two end portions interposed respectively between the end portions and the handle.

16 Claims, 2 Drawing Sheets

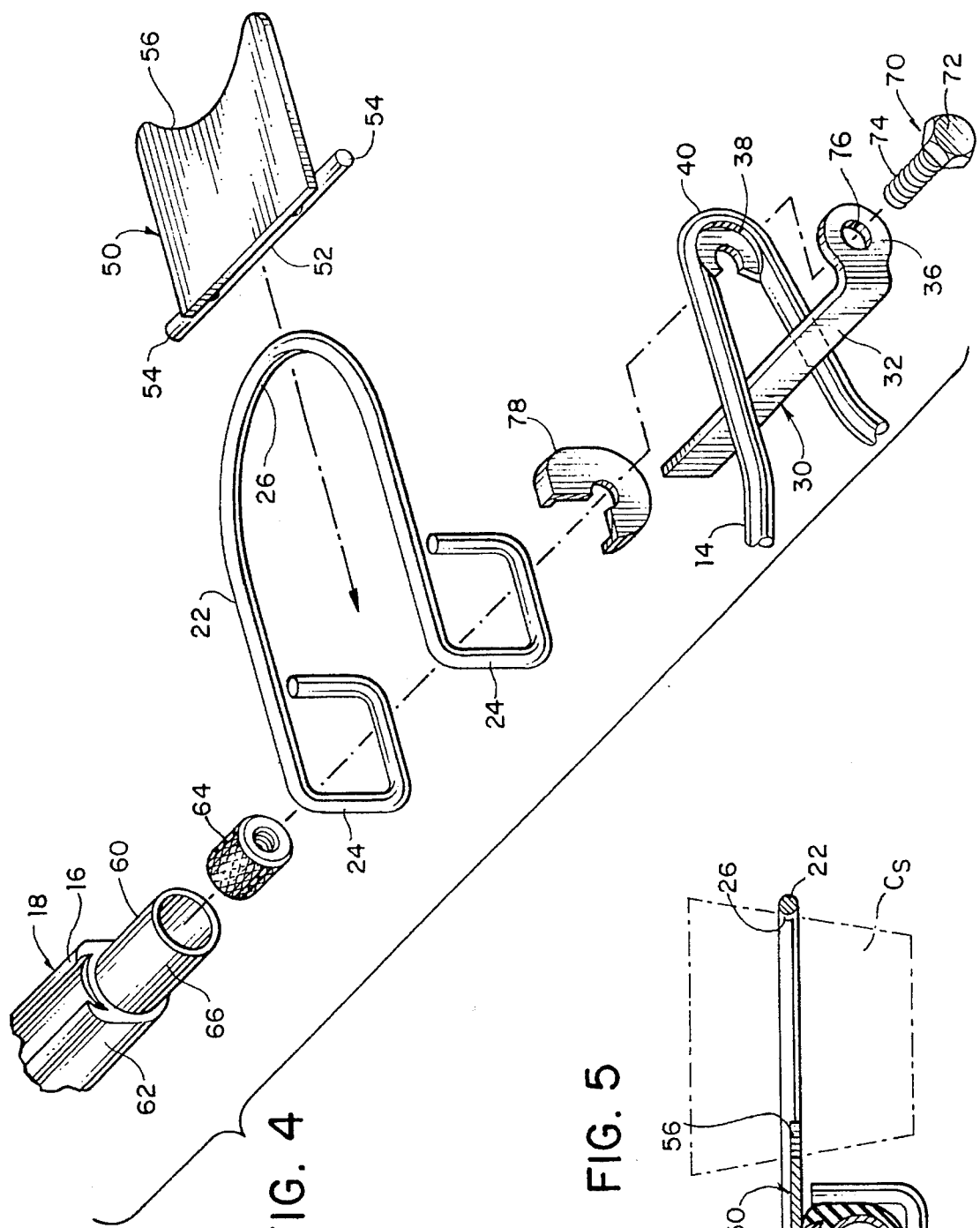

SHOPPING CART WITH ADJUSTABLE HOLDER FOR CUPS

TECHNICAL FIELD OF THE INVENTION

This invention pertains to a shopping cart having a cup holder, which is mounted to a transversely extending handle of the shopping cart, and which can be easily adjusted to accommodate frusto-conical cups of different sizes.

BACKGROUND OF THE INVENTION

Conventionally, a shopping cart has a wheeled chassis, a wire or plastic basket mounted on the chassis, and a transversely extending handle mounted to a rear portion of the chassis or to a rear portion of the basket. As exemplified in Adamson U.S. Pat. No. 5,362,077, it is known to equip such a shopping cart with a cup holder mounted to a transversely extending handle of the shopping cart.

The cup holder disclosed in the Adamson patent is formed of wire with a relatively large loop for holding a relatively large cup having a frusto-conical wall and with a relatively small loop for holding a relatively small cup having a frusto-conical wall. As disclosed therein, the cup holder is mounted slidably to such a handle via two bars mounted fixedly to the handle, and a coupon tray formed of wire is mounted fixedly on the bars.

There has been a need, to which this invention is addressed, for a simpler, more easily mounted cup holder for a shopping cart.

SUMMARY OF THE INVENTION

This invention provides, in and for a shopping cart comprising a handle extending transversely, a cup holder including a holding member and an adjusting member. The holding member is mounted fixedly to the handle so as to project from the handle. The adjusting member is mounted to the handle so as to be movable between an operative position and an inoperative position. The holding member has a concave edge facing toward the handle. The adjusting member has a distal edge facing toward the concave edge of the holding member in the operative position of the adjusting member and away from the concave edge of the holding member in the inoperative position of the adjusting member.

Thus, with the adjusting member in the operative position, the cup holder is adapted to support a relatively small cup having a frusto-conical wall between the concave edge of the holding member and the distal edge of the adjusting member. Also, with the adjusting member in the inoperative position, the cup holder is adapted to support a relatively large cup having a frusto-conical wall between the concave edge of the holding member and a near portion of the handle.

In one contemplated embodiment, the distal edge of the adjusting member is concave. Moreover, the concave edge of the holding member is arcuate with a relatively large diameter, and the distal edge of the adjusting member is arcuate with a relatively small diameter. Furthermore, the adjusting member is mounted to the handle so as to be pivotable between the operative position and the inoperative position and the adjusting member in the operative position extends horizontally toward the concave edge of the holding member.

In a preferred embodiment, the adjusting member is mounted to the handle so as to be pivotable between the operative position and the inoperative position. Moreover, the adjusting member in the operative position extends horizontally toward the concave edge of the holding member.

In the preferred embodiment, the holding member is made from a steel wire and has two end portions wrapped partially around the handle. Moreover, the cup holder further includes a steel strap having a principal portion interposed between the end portions of the wire member and the handle and welded to the wire member. The strap has an end flange extending from the principal portion and mounted fixedly to one end of the handle.

These and other objects, features, and advantages of this invention are evident from the following description of a preferred embodiment of this invention with reference to the accompanying drawings.

BRIEF DESCRIPTION OF THE DRAWINGS

FIG. 4, on a smaller scale, is a fragmentary, perspective, exploded view of the shopping cart and the cup holder.

FIG. 5, on a similar scale, is a cross-sectional view of the cup holder and the shopping cart handle. The adjusting member is shown in the operative position, in full lines, and in the inoperative position, in broken lines. A relatively small cup having a frusto-conical wall is shown in broken lines as being held by the cup holder.

DETAILED DESCRIPTION OF THE PREFERRED EMBODIMENT

Figure 1:
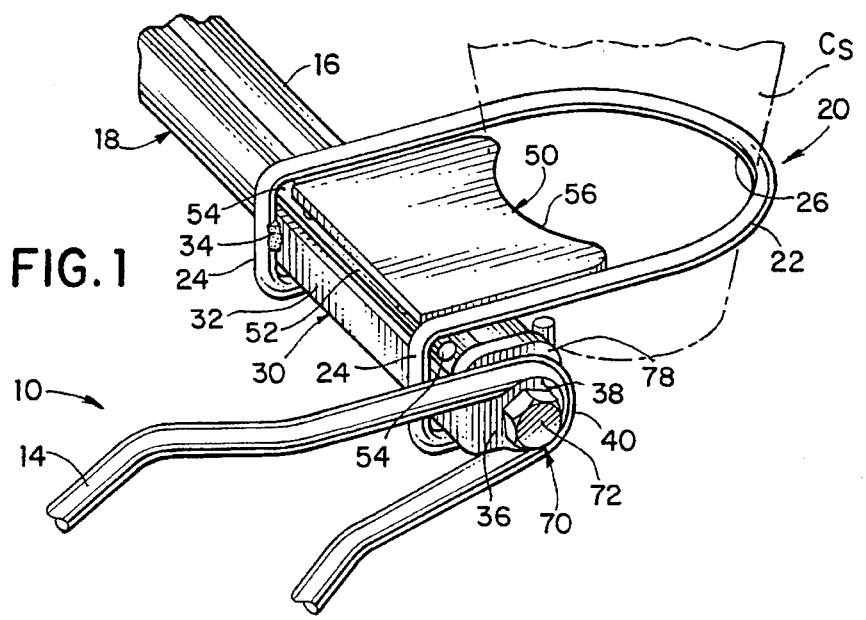
FIG. 1 is a fragmentary, perspective view of a shopping cart equipped with a cup holder mounted to a transversely extending handle of the shopping cart, so as to constitute a preferred embodiment of this invention. An adjusting member of the cup holder is shown in an operative position. A relatively small cup having a frusto-conical wall is shown in broken lines as being held by the cup holder.

As shown in the drawings, a shopping cart 10 equipped with a cup holder 20 constitutes a preferred embodiment of this invention. Apart from the cup holder 20, only a side frame 14 of the shopping cart 10 and one end 16 of a transversely extending handle 18 of the shopping cart 10 are shown.

The side frame 14 is formed of steel wire and is located on one side of the shopping cart 10. The end 16 of the handle 18 is mounted to the side frame 14, in a manner to be later described, and the other end (not shown) of the handle 18 is mounted similarly to a similar frame (not shown) on the other side of the shopping cart 10.

The cup holder 20 includes a holding member 22, which is mounted to the handle 18 so as to project rearwardly from the handle 18. The holding member 24 is formed from a steel wire and has two end portions 24, which are wrapped partially around the handle 18. The holding member 24 has a concave edge 26 facing the handle 18. The concave edge 26 is arcuate with a diameter $D_L$ that is relatively large, as compared to another diameter to be later mentioned.

The cup holder 20 further includes a steel strap 30 having a principal portion 32, which is interposed between the end portions 24 of the holding member 24, and which is welded to the holding member 24 via spot welds 34. The strap 30 also has an end flange 36, which is fitted into a recess 38 at a bend 40 in the side frame 14, and which is mounted fixedly to the end 16 of the handle 18.

The cup holder 20 further includes an adjusting member 50, which is formed from a steel plate, and is welded to a steel wire 52 having two end portions 54, each of which is interposed between one of the end portions 24 of the holding member 24 and the handle 18 so as to mount the adjusting member pivotably to the handle 18. The adjusting member 50 has a concave, arcuate, distal edge 56 with a diameter $D_S$ that is relatively small, as compared to the diameter $D_L$ of the concave edge 26 of the holding member 24. As an example, the relatively small diameter $D_S$ may be approximately 2.5 inches, and the relatively large diameter $D_L$ may be approximately 3.0 inches.

Figure 2:
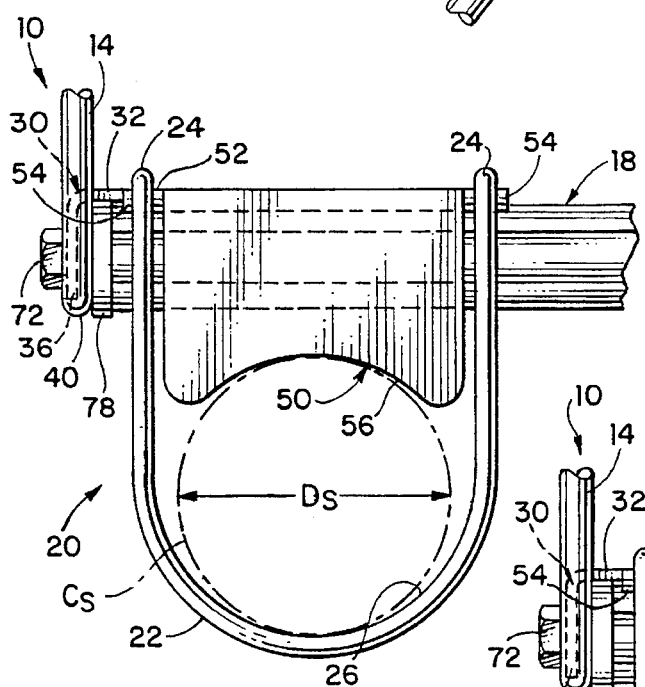
FIG. 2 is a fragmentary, plan view of the shopping cart, the cup holder, and the same cup, as shown in FIG. 1.
Figure 3:
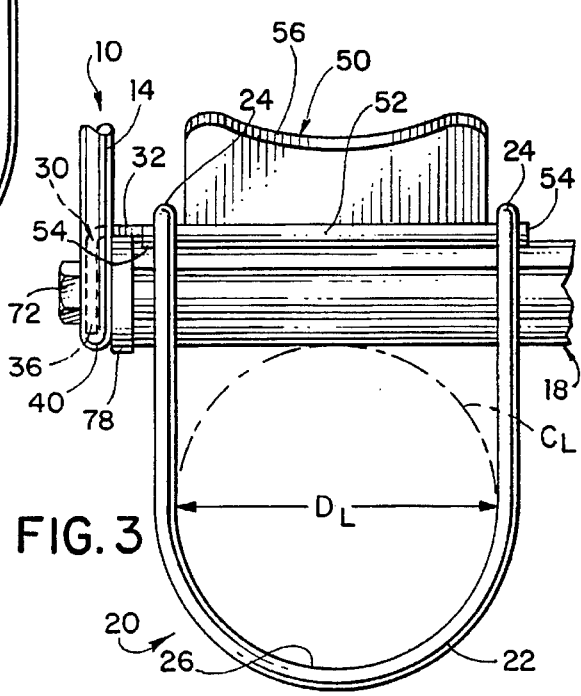
FIG. 3 is a fragmentary, plan view of the shopping cart and the cup holder. The adjusting member is shown in an inoperative position. A relatively large cup having a frusto-conical wall is shown in broken lines as being held by the cup holder.

The adjusting member 50 is pivotable between an operative position, in which the adjusting member 50 projects backwardly and horizontally and rests against the handle 18 so that the concave edge 56 of the adjusting member 50 faces toward the concave edge 26 of the holding member 24, and an inoperative position, in which the adjusting member 50 projects upwardly and forwardly with the welds 34 resting against the strap 30 so that the concave edge 56 of the adjusting member 50 faces away from the concave edge 26 of the holding member 24. In FIGS. 1 and 2 and, in full lines, in FIG. 5, the adjusting member 50 is shown in the operative position. In FIG. 3 and, in broken lines, in FIG. 5, the adjusting member 50 is shown in the inoperative position.

As shown in FIGS. 4 and 5, the handle 18 comprises a steel tube 60, which is covered with a rigid, tubular, polymeric grip 62. A knurled nut 64 is fitted into one end 66 of the tube 60 and the end 66 is crimped so as to secure the nut 60. A bolt 70 having a hexagonal head 72 and a threaded shank 74 is employed with the threaded shank 74 passed through a hole 74 in the end flange 36 of the strap 30 with the end flange 36 fitted into the recess 38 at the bend 40 in the side frame 14, passed through an annular, elastomeric grommet 78, and threaded into the nut 60, so as to assemble the side frame 14, the handle 18, and the cup holder 20. The nut 64, bolt 70, and grommet 78 would be similarly employed to assemble the side frame and the handle 18 to each other, if the cup holder 20 were not employed.

Thus, with the adjusting member 50 in the operative position, the cup holder 20 is adapted to support a relatively small cup $C_S$ having a frusto-conical wall between the concave edge 26 of the holding member 24 and the concave edge 56 of the adjusting member, as shown in FIGS. 1, 2, and 5. Also, with the adjusting member 50 in the inoperative position, the cup holder 20 is adapted to support a relatively large cup $C_L$ having a frusto-conical wall between the concave edge 26 of the holding member and a near portion 80 of the handle 18, as shown in FIG. 3.

Various modifications may be made in the preferred embodiment described above without departing from the scope and spirit of this invention.

We claim:

1. A shopping cart comprising a handle extending transversely and a cup holder, the cup holder including a holding member mounted fixedly to the handle so as to project from the handle and an adjusting member mounted to the handle so as to be movable between an operative position and an inoperative position, the holding member having a concave edge facing toward the handle, the adjusting member having a distal edge facing toward the concave edge of the holding member in the operative position of the adjusting member and away from the concave edge of the holding member in the inoperative position of the adjusting member, wherein the cup holder is adapted to support a relatively small cup having a frusto-conical wall between the concave edge of the holding member and the distal edge of the adjusting member with the adjusting member in the operative position, and wherein the cup holder is adapted to support a relatively large cup having a frusto-conical wall between the concave edge of the holding member and a near portion of the handle with the adjusting member in the inoperative position.

2. The shopping cart of claim 1 wherein the distal edge of the adjusting member is concave.

3. The shopping cart of claim 2 wherein the concave edge of the holding member is arcuate with a relatively large diameter and wherein the distal edge of the adjusting member is arcuate with a relatively small diameter.

4. The shopping cart of claim 1 wherein the adjusting member is mounted to the handle so as to be pivotable between the operative position and the inoperative position.

5. The shopping cart of claim 4 wherein the adjusting member in the operative position extends horizontally toward the concave edge of the holding member.

6. The shopping cart of claim 1 wherein the holding member is made from a steel wire and has two end portions wrapped partially around the handle, the cup holder further including a steel strap having a principal portion interposed between the end portions of the holding member and the handle and welded to the holding member, the strap having an end flange integral with the principal portion and mounted fixedly to one end of the handle.

7. The shopping cart of claim 6 wherein the adjusting member is made from a steel plate and is welded to a steel wire having two end portions, each of which is interposed between one of the end portions of the holding member and the handle so as to mount the adjusting member pivotably to the handle.

8. The shopping cart of claim 7 wherein the concave edge of the holding member is concave and arcuate with a relatively large diameter and wherein the distal edge of the adjusting member is arcuate with a relatively small diameter.

9. A cup holder for a shopping cart comprising a handle extending transversely, the cup holder including a holding member adapted to be mounted fixedly to the handle so as to project from the handle and an adjusting member adapted to be mounted to the handle so as to be movable between an operative position and an inoperative position, the holding member having a concave edge facing toward the handle when the holding member is mounted to the handle, the adjusting member having a distal edge facing toward the concave edge of the holding member in the operative position of the adjusting member when the adjusting member is mounted to the handle and facing away from the concave edge of the holding member in the inoperative position of the adjusting member when the adjusting member is mounted to the handle, wherein the cup holder is adapted to support a relatively small cup having a frusto-conical wall between the concave edge of the holding member and the distal edge of the adjusting member with the adjusting member in the operative position, and wherein the cup holder is adapted to support a relatively large cup having a frusto-conical wall between the concave edge of the holding member and a near portion of the handle with the adjusting member in the inoperative position.

10. The cup holder of claim 9 wherein the distal edge of the adjusting member is concave.

11. The cup holder of claim 10 wherein the concave edge of the holding member is arcuate with a relatively large diameter and wherein the distal edge of the adjusting member is arcuate with a relatively small diameter.

12. The cup holder of claim 11 wherein the adjusting member is adapted to be mounted to the handle so as to be pivotable between the operative position and the inoperative position.

13. The cup holder of claim 12 wherein the adjusting member in the operative position extends horizontally toward the concave edge of the holding member.

14. The cup holder of claim 9 wherein the holding member is made from a steel wire and has two end portions adapted to be wrapped partially around the handle, the cup holder further including a steel strap having a principal portion adapted to be interposed between the end portions of the holding member and the handle, the principal portion being welded to the holding member, the strap having an end flange integral with the principal portion and adapted to be mounted fixedly to one end of the handle.

15. The cup holder of claim 14 wherein the adjusting member is made from a steel plate and is welded to a steel wire having two end portions, each of which is adapted to be interposed between one of the end portions of the holding member and the handle so as to mount the adjusting member pivotably to the handle.

16. The cup holder of claim 15 wherein the concave edge of the holding member is arcuate with a relatively large diameter and wherein the distal edge of the adjusting member is concave and arcuate with a relatively small diameter.

* * * * *

UNITED STATES PATENT AND TRADEMARK OFFICE
CERTIFICATE OF CORRECTION

PATENT NO. : 5,494,306

DATED : February 27, 1996

INVENTOR(S) : Adamson et al.

It is certified that error appears in the above-indentified patent and that said Letters Patent is hereby corrected as shown below:

Column 3, in lines 37 and 42, "nut 60" should be --nut 64--; and

Column 3, line 40, "hole 74" should be --hole 76--.

Signed and Sealed this

Twentieth Day of August, 1996

Attest:

BRUCE LEHMAN

*Attesting Officer*      *Commissioner of Patents and Trademarks*